(12) United States Patent
Young

(10) Patent No.: US 6,239,708 B1
(45) Date of Patent: May 29, 2001

(54) APPARATUS FOR WATER FLOW MEASUREMENT

(76) Inventor: Richard Young, 9709 Winding Oak Dr., Oklahoma City, OK (US) 73151

( * ) Notice: Subject to any disclaimer, the term of this patent is extended or adjusted under 35 U.S.C. 154(b) by 0 days.

(21) Appl. No.: 09/483,999

(22) Filed: Jan. 18, 2000

Related U.S. Application Data

(63) Continuation-in-part of application No. 09/098,976, filed on Jun. 17, 1998, now Pat. No. 6,081,196.

(51) Int. Cl.[7] .................................................... G08B 21/00
(52) U.S. Cl. .............................. 340/606; 340/611; 73/251
(58) Field of Search ................................... 340/606, 607, 340/608, 609, 610, 611, 618; 73/251, 242, 273, 861.58, 861.61; 137/80, 119.06, 624.2, 624.15

(56) References Cited

U.S. PATENT DOCUMENTS

| | | | |
|---|---|---|---|
| 3,876,009 | 4/1975 | Johnson, Jr. | 169/24 |
| 4,096,747 * | 6/1978 | Gilson | 73/251 |
| 4,791,414 | 12/1988 | Griess | 340/606 |
| 4,805,701 | 2/1989 | Mountford | 169/57 |
| 5,085,076 | 2/1992 | Engelmann | 73/197 |
| 5,139,044 | 8/1992 | Otten et al. | 137/80 |
| 5,228,469 | 7/1993 | Otten et al. | 137/80 |
| 5,236,002 | 8/1993 | Martin et al. | 137/119.06 |
| 5,390,744 * | 2/1995 | McHugh | 169/23 |
| 5,419,203 | 5/1995 | Carmichael | 73/861.58 |
| 5,483,838 | 1/1996 | Holden | 73/861.61 |
| 5,546,801 | 8/1996 | Swinson et al. | 73/273 |

OTHER PUBLICATIONS

Potter Marketing Brochures showing flow meters with alarm outputs.

* cited by examiner

Primary Examiner—Van T. Trieu
(74) Attorney, Agent, or Firm—Edward L. White

(57) ABSTRACT

An apparatus for a flow-based fire alarm. A bypass system is provided to allow sufficient water flow where a pressure drop, particularly in a residential or multi-purpose piping system such as a water softener is encountered, by providing an alternate, lower pressure flow path allowing additional flow when the pressure drop through the system becomes too great. Flow detection means are also provided with minimal pressure drop to insure that flow for fire protection need is not unduly restricted. The flow detection means includes either a differential pressure switch coupled to an orifice plate or a moving orifice plate having thereon a magnet, which communicates with a Reed switch in proportion to the flow therethrough.

3 Claims, 9 Drawing Sheets

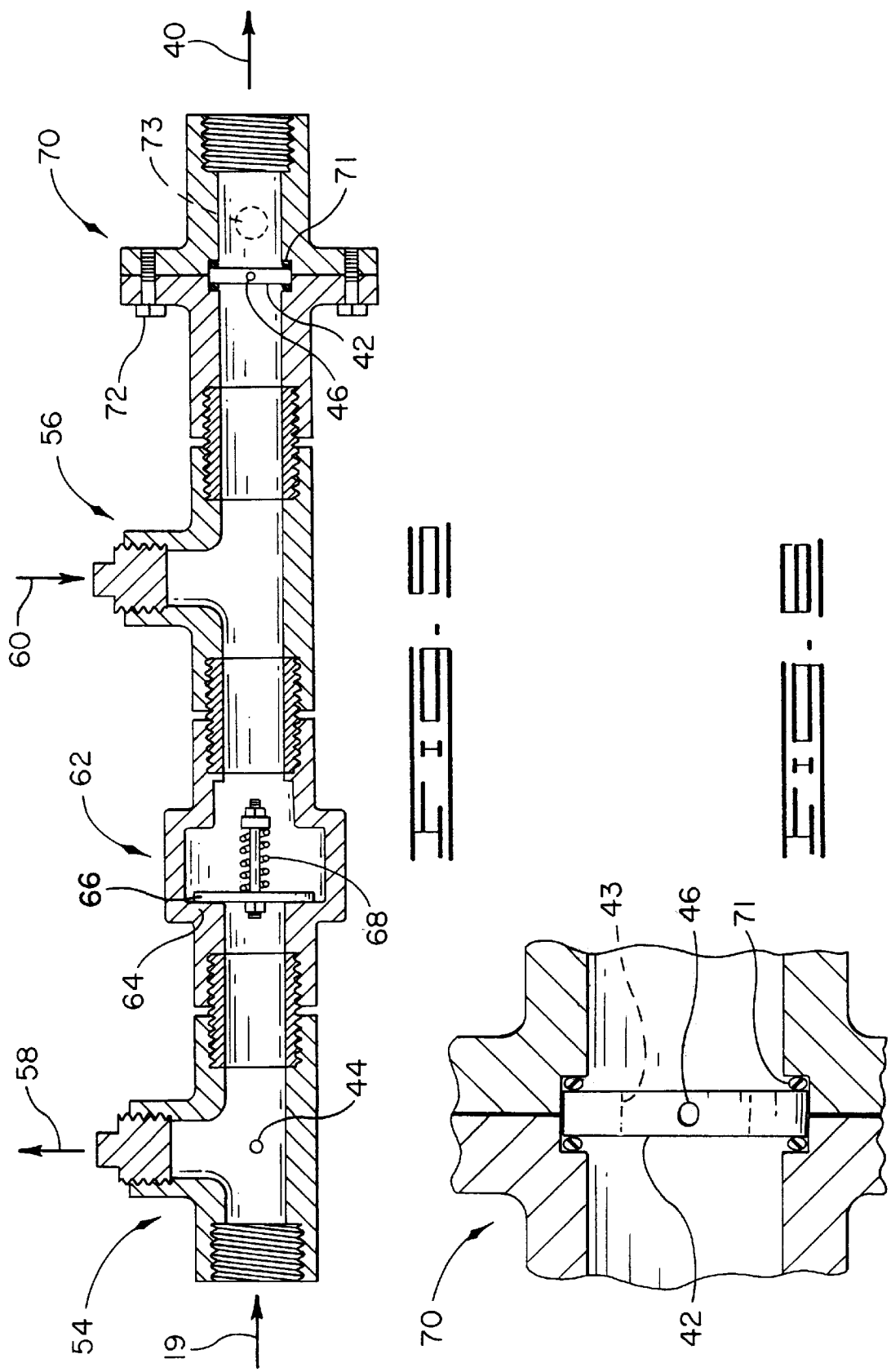

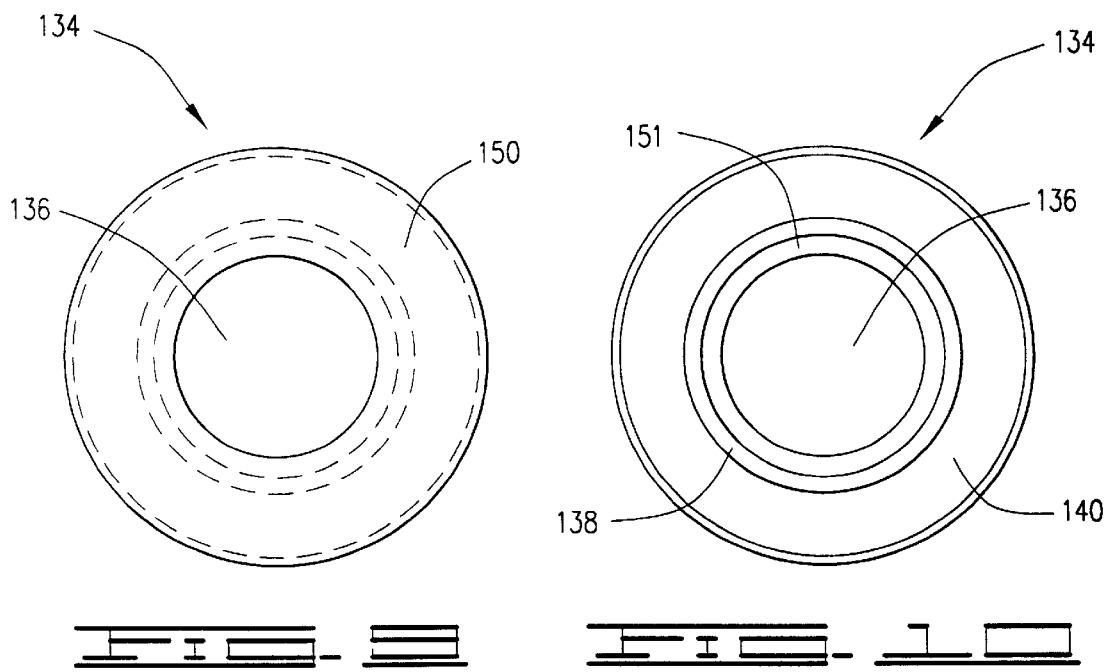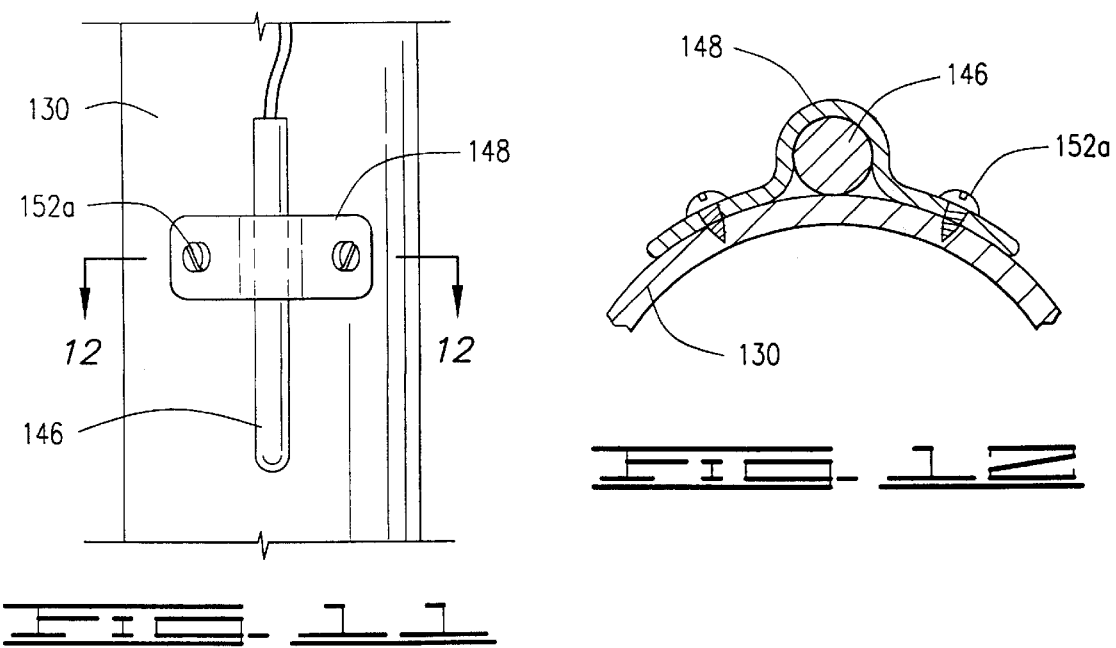

APPARATUS FOR WATER FLOW MEASUREMENT

CROSS REFERENCE TO RELATED APPLICATIONS

This is a continuation-in-part of Ser. No. 09/098,976 filed Jun. 17, 1998, Now U.S. Pat. No. 6,081,196.

BACKGROUND OF THE INVENTION

1. Field of the Invention

The invention relates to the field of flow measurement. The invention provides an improved apparatus for determining the flow through a fire protection and/or domestic water supply system. In particular, the invention provides a flow detection and measurement means for distinguishing typical domestic water flow from the fire protection flow caused by one or more sprinkler heads. The invention also allows use of a water softener or similar device with a multipurpose piping system ("MPS") by providing a bypass around the water softener to ensure sufficient water flow for fire protection means. The invention also provides simple and inexpensive devices to measure flow with minimal pressure drop.

2. Description of the Prior Art

It is well known to provide a means for enunciating an alarm when water flows through a fire protection system. Typical fire protection systems do not have significant water flow therethrough unless a sprinkler head is activated by a fire. Thus, the typical commercial system need only to detect whether or not flow is present, and if so, an alarm must be enunciated.

In application Ser. No. 09/098,976 filed on Jun. 17, 1998, for an Apparatus And Method For Multipurpose Residential Water Flow Fire Alarm, a method was disclosed which allows the same piping to be used for both domestic and fire protection needs. The method provided for a flow detection and measurement means which is capable of distinguishing typical domestic flow from fire protection flow caused by the operation of one or more sprinkler heads.

The National Fire Protection Association ("NFPA") has established standards for the design and operation of multipurpose residential fire sprinkler systems. The standard is known as NFPA 13D, 1999 Ed. It defines a multipurpose piping system as "[a] piping system within dwellings and manufactured homes intended to serve both domestic and fire protection needs."

Typical commercial fire sprinkler systems utilize a water flow detector to provide an alarm means. When a flow of sufficient, minimal, volume is detected, typical commercial systems indicate an alarm condition. The only reason that water typically flows in commercial systems is activation of a sprinkler head. Therefore, in a typical commercial system an alarm means need only determine whether or not water is flowing.

In an MPS water regularly flows through the common piping. Flows occur to supply domestic needs within the residence. Whenever a sink, shower or toilet valve open, water flows in the MPS. Therefore, the alarm system used on typical commercial applications will not work for MPS because simply taking a shower would cause a typical commercial flow detector to alarm when used with an MPS.

In light of this problem, typical residential applications have two completely different piping systems: (1) a fire sprinkler piping system, and (2) a domestic piping system. This basically doubles the number of pipes and the amount of plumbing work which has to be performed in a typical residential application. The same set of piping could not previously be used for both systems because the flow alarm would send false signals every time domestic water was turned on. Alternatively, a residential application could use a fire detection system (i.e., electronic fire sensor system). However, a fire detection system does not alarm when water flows. Therefore, with a fire detection system and no flow alarm, the fire sprinklers could run for days, causing extensive water damage, while the home owner is away on vacation and no alarm would sound.

As noted above, U.S. patent application Ser. No. 09/098,976 filed Jun. 1, 1998, disclosed an APPARATUS AND METHOD FOR MULTIPURPOSE RESIDENTIAL WATER FLOW FIRE ALARM. The apparatus for use as a multipurpose residential fire suppression water flow alarm system disclosed in that application was comprised of a supply side for delivering water under pressure; a multipurpose piping system having a system side with common piping for delivering water from the supply side to a fire suppression side with one or more sprinkler heads and a domestic side for one or more domestic uses; a detecting means for detecting fire protection flow and for distinguishing that flow from a maximum domestic flow, the detecting means being disposed between the supply side and the system side; a drain test connection; and an alarm means. The method of utilizing the apparatus described above was also disclosed. One of the dependent claims from the above-noted application, claimed a detecting means comprised of an orifice plate through which water flows causing a differential pressure measured by a differential pressure switch so that the flow rate to the orifice plate is proportional to the differential pressure allowing a determination of flow rate based on the differential pressure measured.

It was disclosed that the flow detection means could utilize any number of well known flow measurement technologies, such as U.S. Pat. No. 5,288,469 to Otten et al. However, Otten's device would be less than optimal for the current application because, when fire protection flows are needed, it is desirable to have a flow measurement device which has minimal pressure drop. The Otten device incorporates both an orifice plate and a cone-shaped plug around which the water flows. The cone-shaped plug causes a greater pressure drop than the orifice plate alone. U.S. Pat. No. 5,419,203 to Carmichael discloses a device similar to the device disclosed by Otten. Otten utilizes the Hall effect to measure the displacement of a displacement piston having incorporated therein a magnet. Carmichael utilizes strain sensors to measure the strain caused by displacement of a cone-shaped plug biased by a spring member. As the flow increases, the cone-shaped plug displaces backwardly in reaction to the flow putting greater pressure on the spring and consequently, greater pressure on the pressure sensors incorporated in the device. The Otten and Carmichael devices have several common features, namely a chamber having an orifice plate and a plug-shaped device adapted to be deflected away from the orifice plate in proportion to the flow rate through the chamber. Both Otten and Carmichael have the same primary drawback for use in multipurpose residential systems, namely the substantial pressure drop across these devices. Therefore, there is a need for a flow detection and measurement means for use in an MPS which causes less pressure drop in such a system. At the same time, the means must be simple in both operation and concept so that it will be inexpensive to build and can be easily programed and calibrated in the field.

Critics of MPS systems have also noted that it is common for residential systems to incorporate a water softener or similar devices (such as filters, chlorination systems, UV purifiers and the like). Water softeners and similar devices can create substantial drops in system pressure such that the water supply flowing through a typical residential system may not be sufficient for fire protection needs. Therefore, there is a need for a bypass mechanism which will allow sufficient flow in fire protection situations to bypass the water softener to supply the fire protection needs.

SUMMARY OF THE INVENTION

It is therefore an object of the invention to provide a flow detection and measurement means for use in multipurpose residential water flow fire alarm systems which overcome one or more of the disadvantages of the prior systems.

In particular, it is an object of the present invention to provide a means to compensate for pressure drops in a typical MPS system. More particularly, typical pressure drops include, but are not limited to, a water softener which may be placed in line in the system. Water softeners are typically used in multipurpose systems to improve the quality of water for domestic use in the residence. In addition to water softeners, pressure drops may include filters, UV treatment of water, and the like. There are many reasons why people want to treat water coming into their homes for domestic purposes. Many of these treatment means will reduce the pressure of the water through the MPS system. Thus, there may be a need for fire protection flows to bypass these pressure drops in the system, or to at least compensate for them. The present invention takes these types of pressure drops into account by providing a bypass means. In typical domestic flow situations, the entire flow of the water supply goes through the treatment method in question, such as a water softener. However, when the system side pressure drops below a set level, a relief allows additional flows through a lower pressure drop path.

By the same token, devices previously available for the measurement of flow caused another pressure drop. As noted above, the pressure drops in an MPS system can prevent sufficient flow from being available to satisfy fire protection needs. Therefore, it is also an object of the present invention to provide a volume flow detection and measurement means for use in MPS systems which have minimal pressure drops. The flow detection means discussed are very simple in operation and easy to calibrate in the field. They may be used to provide a read out of the flow, or may simply provide an alarm when fire protection flows are detected.

It is also an object of the present invention to provide a flow measurement device with a higher capacity still for use in standard wet pipe systems. Under some circumstances, it may be desirable to use an expanded chamber system along with the orifice plate. In these systems, as the orifice plate is deflected backwardly by the water pressure, it moves into an area of expanded cross-section where the water can flow not only through the center of the orifice plate, but around the edges thereof. This expanded area minimizes the pressure drop through the flow sensor at high demands, such as is the case where multiple sprinkler heads may have activated.

Finally, it is an object of the invention to provide a integrated system incorporating the above-noted elements of the invention and having a two-stage alarm for enunciating a pre-alarm, as well as a full-blown fire alarm. The integrated system has two sensors on the flow detection device, the first sensor enunciating a trouble alarm when a specified flow is created, and if the flow further increases, a second sensor enunciating a fire alarm, which also preferably calls emergency response personnel. The first trouble alarm is audible only in the residence or structure where the system is deployed. Preferably, as noted, the second fire alarm will contact emergency personnel, possibly via a telephone modem-type connection. The integrated system also preferably incorporates a tamper trouble alarm on a valve incorporated in the system to shut off the flow thereto. The trouble alarm will enunciate if water flow to the fire protection system is shut off.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

In the drawings:

FIG. 5 is a cross-section of a flow bypass system for use with water softeners and the like;

FIG. 6 is a detail of an orifice plate used in the bypass system for flow measurement;

FIG. 8 is a cross-sectional view of a residential flow switch with an electronic out put for use in an alarm system;

FIG. 9 is a front view of the moving orifice plate used in the above-noted flow sensor;

FIG. 10 is a back view of the moving orifice plate, with the orifice plat magnet disposed thereon;

FIG. 11 is a detailed view of the Reed switch and adjustable attachment means therefor;

FIG. 12 is a cross-sectional view of the Reed switch and adjustable attachment means therefor.

DESCRIPTION OF THE PREFERRED EMBODIMENT

Figure 1:
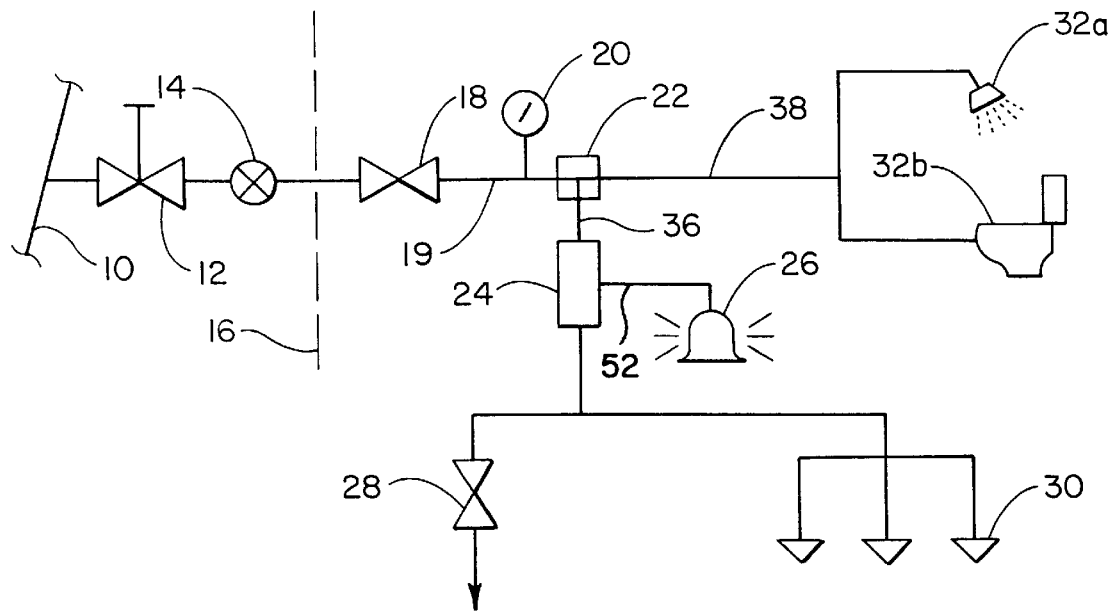
FIG. 1 is an illustration of a typical NFPA 13D sprinkler system.

A typical NFPA 13D system is illustrated by FIG. 1. City water or other supply means 10 are connected to a supply system leading into the house. Water first flows through an outside gate valve 12. The valve 12 is typically integrally connected with a water meter 14, though the two parts may be completely separate. After flowing through the valve 12 and meter 14 the water passes the exterior wall 16 of the residence. A main control valve 18 is provided in case it becomes necessary to shut off all the water in the house. Though shown inside the residence the main control valve 18 may also be outside of the residence. A pressure gauge 20 is commonly provided to monitor water pressure in the system. A flow splitter 22 divides the water supply into two distinct streams: (a) a fire side 36, and (b) a domestic side 38. Following the flow splitter a flow detection means 24 is provided on the fire side 36. The flow detection means is coupled to an alarm means 26. Upon detection of flow by the flow detection means 24, a signal is sent to the alarm means 26, which creates an alarm condition therein. Piping leads away from the flow detection means to a drain/test connection 28. The drain/test connection serves two purposes: it allows the fire side 36 to be drained, and it allows for simulation of the flow rate created by the operation of a sprinkler head 30. Piping also leads away from the flow detection means 24 to at least one sprinkler head 30. A separate set of piping, the domestic side 38, leads to one or more domestic uses 32.

It is known that domestic uses of water can have a high enough flow rate to detract from fire protection needs. Therefore, the prior art also discloses a domestic water supply shut-off valve, which is effectively incorporated into the flow splitter 22 for shutting off water supply to the domestic side 38. Such a shut-off valve is illustrated by U.S. Pat. No. 5,236,002 to Martin, et al., and incorporated herein by reference.

A typical NFPA 13D system requires two complete sets of piping, both fire side piping 36 and domestic piping 38 to be run throughout the house. These two pipes running side by side require substantial increased material and labor costs to install. Further, for an existing structure, it may be extremely expensive or even impossible to install the second set of piping required for a fire sprinkler system. Given these two problems of additional costs, and the problem with retrofits, a multi-purpose system was envisioned by the NFPA. However, the NFPA provides no means for alarming upon a water flow condition in an MPS.

Figure 2:
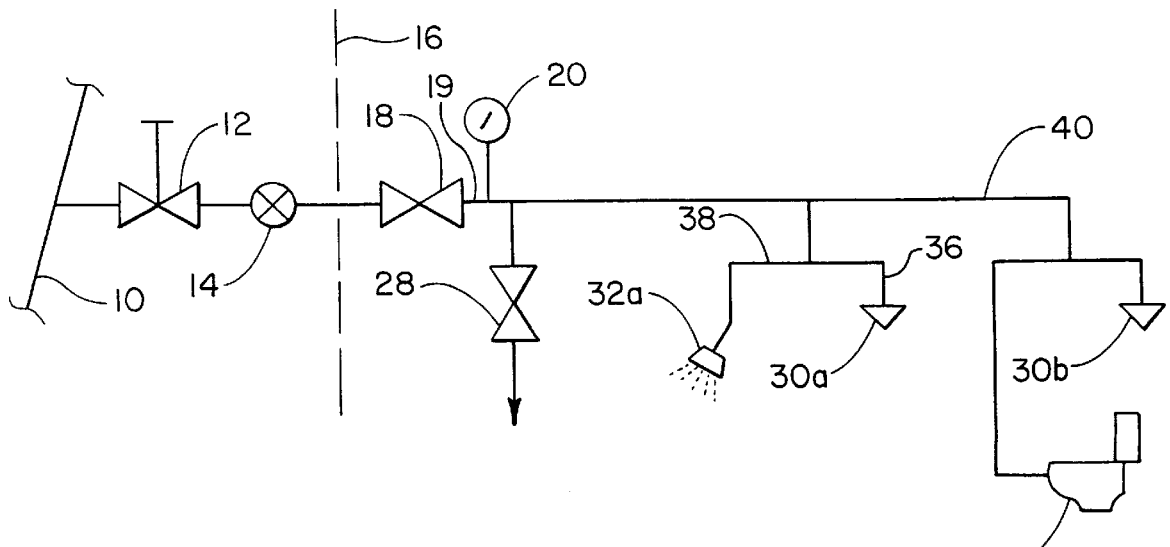
FIG. 2 is a prior multi-purpose system, which has no way to alarm.

FIG. 2 illustrates the prior MPS. Again, a city or other domestic water supply 10 is provided. The water flows through the outside gate valve 12 and water meter 14 through the outer wall 16 of the residence. Thence the water flows through the main control valve 18. A pressure gauge 20 is typically provided to monitor water pressure in the system. No flow splitter 22 (shown in FIG. 1) is required for an MPS. A drain test connection 28 is still provided, but there is no flow detection means 24. As noted above, typical flow detection means 24 alarm upon detection of a minimum flow. Therefore, given the common piping system 40 in the MPS, typical domestic uses would cause the prior art flow detection means to send an alarm signal to the alarm means 26. NFPA 72 provided for installation of a non-water-flow-based fire detection and alarm system for use with MPS. These non-water-flow-based fire detection and alarm systems are expensive, and they are not capable of detecting flow through one or more fire protection sprinklers. The inability of a fire detection system to detect and enunciate a water flow alarm could result in extensive water damage to the property.

Figure 3:
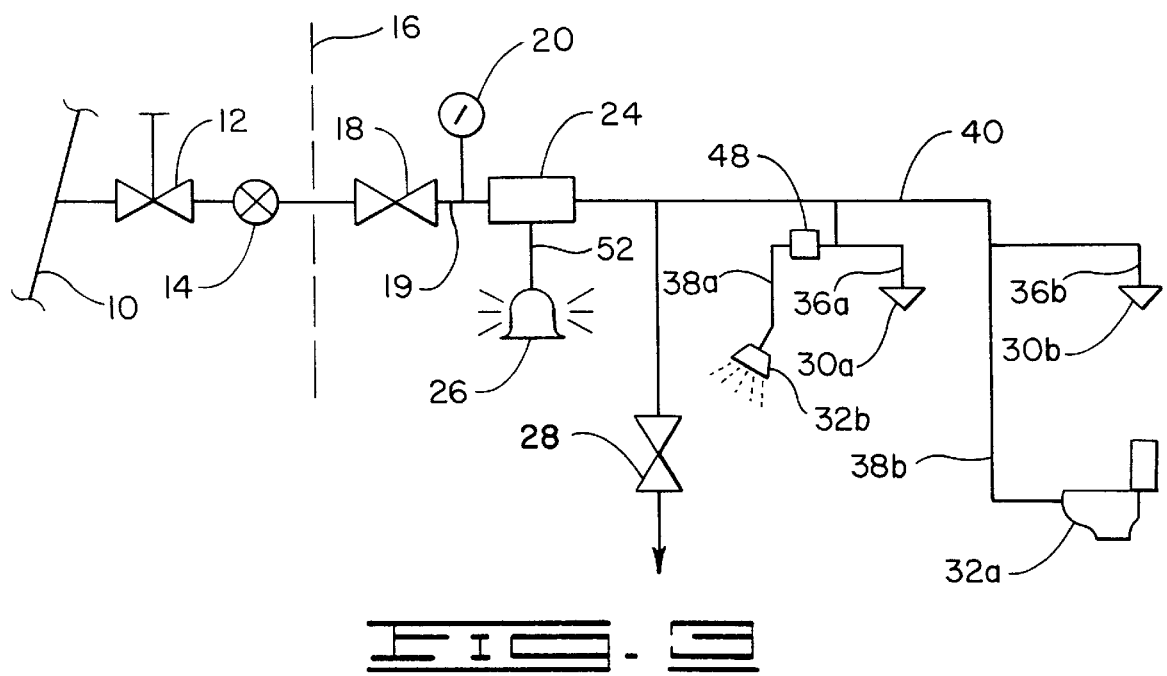
FIG. 3 illustrates an MPS system with a water flow alarm.

FIG. 3 illustrates an MPS system with a water flow alarm. Again a city/domestic water supply 10 is provided. The water flows through the city or outside gate valve 12 through the water meter 14 and past the outer wall 16 of the residence. Once inside the house it passes through a main control valve 18. As with the prior art multi-purpose residential system described in FIG. 2, common piping 40, carries water throughout the system. After passing through the main control valve 18, water passes by a pressure gauge 20, then through a flow detection means 24. In combination the flow detection means 24 and the pressure gauge 20 allow for determination of whether the water supply is sufficient for fire protection needs. The flow detection means is connected to an alarm means which is activated upon the detection of a flow rate greater than maximum domestic flow. Methods of detecting and measuring flow and alarming upon excessive flow are illustrated, for example, in Otten, et al., U.S. Pat. No. 5,228,469, incorporated herein by reference. Disposed after the detection means is a drain test connection 28. This drain test connection 28 serves the same purpose as it did in the prior art (See FIG. 1). The drain test connection 28 may include an orifice plate with interchangeable orifice plates for simulating different flow regimes. For example, one orifice plate could simulate the operation of a single fire sprinkler while another orifice plate simulated the domestic usage. These interchangeable orifice plates could then be used to calibrate the operation of the alarm means. Common piping 40 carries water throughout the system to both domestic 32 and fire protection 30 uses. Rather than having distinct fire sides 36 and domestic sides 38, the invention has short sections of pipe split off from the common piping 40 which are designated as either fire side 36 or domestic side 38.

A means of determining the domestic and fire protection flows will be through the establishment of a "K" values for each. For each flow, the maximum volumetric flow "Q" (usually measured in gallons per minute) is divided by the square root of the pressure "P" (usually measured in pounds per square inch). Thus the formula is as follows:

$$K = \frac{Q}{\sqrt{P}}$$

The greater the "K" value, the greater the flow at any pressure. Typical fire protection "K" values are 4.3 or greater while typical domestic "K" values are 3.3 or less. Thus, the invention takes advantage of the difference in "K" values to distinguish domestic from fire protection flows. The prior art does not anticipate nor suggest that the differing flows for domestic and fire protection uses, as represented by "K" values, could be used as the basis for a flow-based fire protection alarm.

The flow detection means 24 could utilize any number of well known flow measurement technologies. See, e.g., Otten et al., U.S. Pat. No. 5,228,469, and Holden, U.S. Pat. No. 5,483,383.

Figure 4:
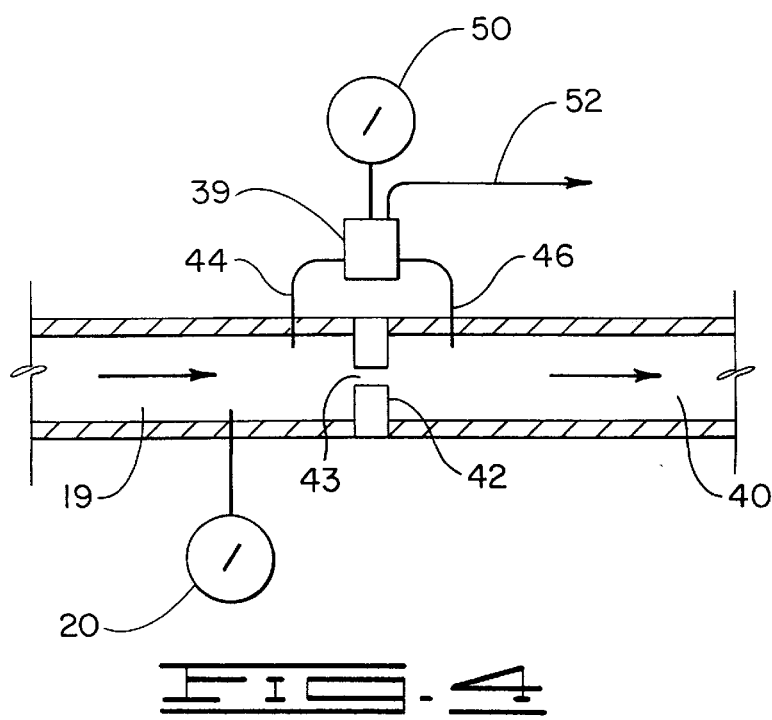
FIG. 4 is a detail of a differential pressure flow detection means.

FIG. 4 illustrates an orifice plate flow detection system. An orifice plate in the common piping will create a differential pressure which is proportional to the flow rate through the pipe. The orifice plate 42 is disposed within the common piping 40. An upstream pressure sampling port 44 and a downstream pressure sampling port 46 are connected to a differential pressure switch 48. The differential pressure between the upstream sampling port 44 and downstream sampling port 46 is proportional to the flow rate through the common piping 40. The pressure indicated by the differential pressure switch 48 corresponds to a flow rate which can be displayed on an appropriate gauge or digital readout 50. An alarm output 52 is connected to the alarm mechanism 26 for creating an alarm condition when the flow rate indicated by the differential pressure exceeds some preset value. The drain/test connection could also employ an orifice plate device, preferably accepting interchangeable orifice plates, to simulate the domestic and fire protection demands. The flow could also be measured by a multitude of devices commercially available for detection of flow rate including mass flow meters, pitot tubes, momentum-base flow meters and a multitude of other systems. The orifice plate system is also used in the improved flow measurement means shown in FIGS. 8 through 11, described below.

Figure 7:
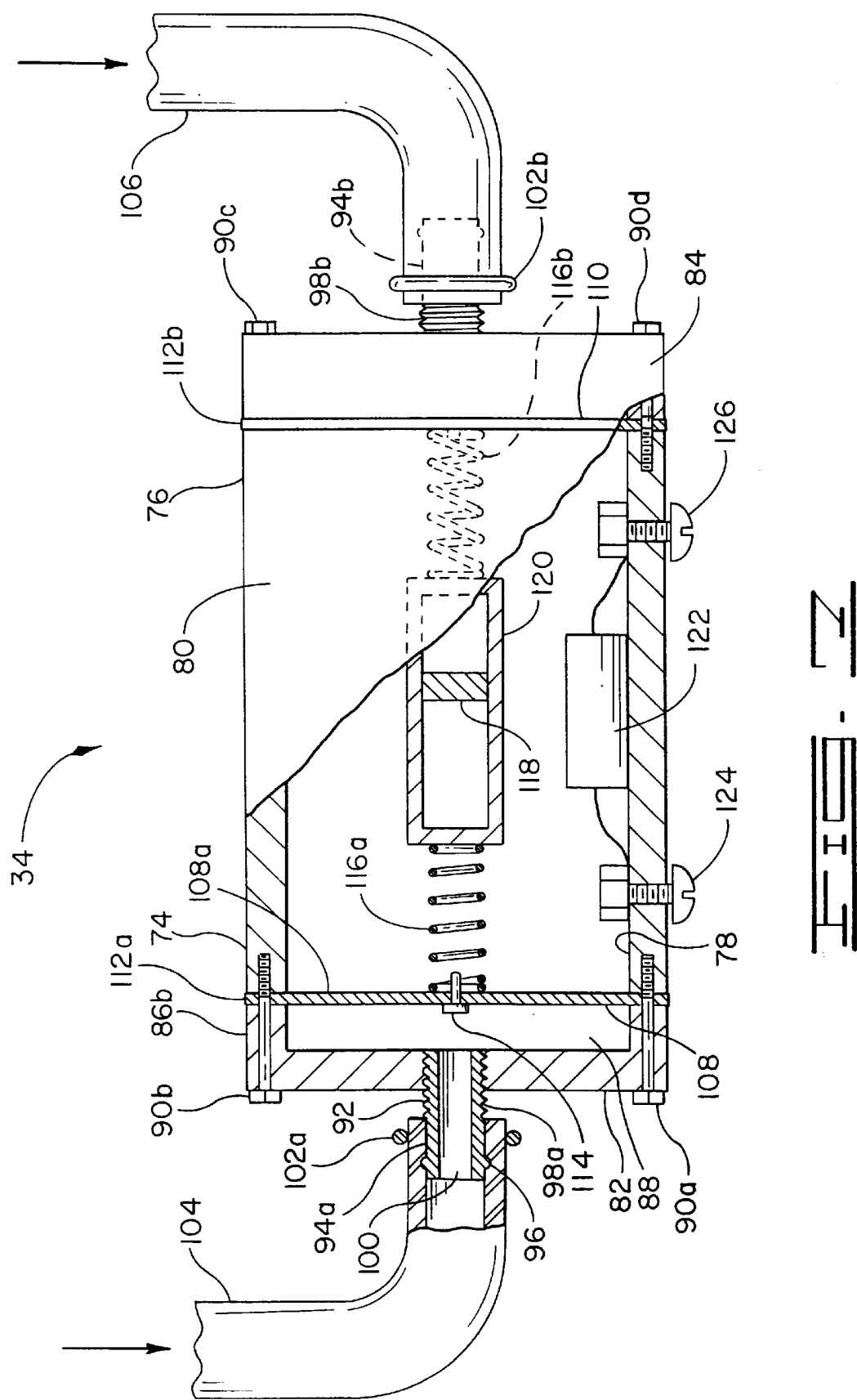
FIG. 7 is a cross-sectional view of a differential pressure switch which can be used to measure differential pressure across an orifice plate such as that shown in FIG. 6.
Figure 5:
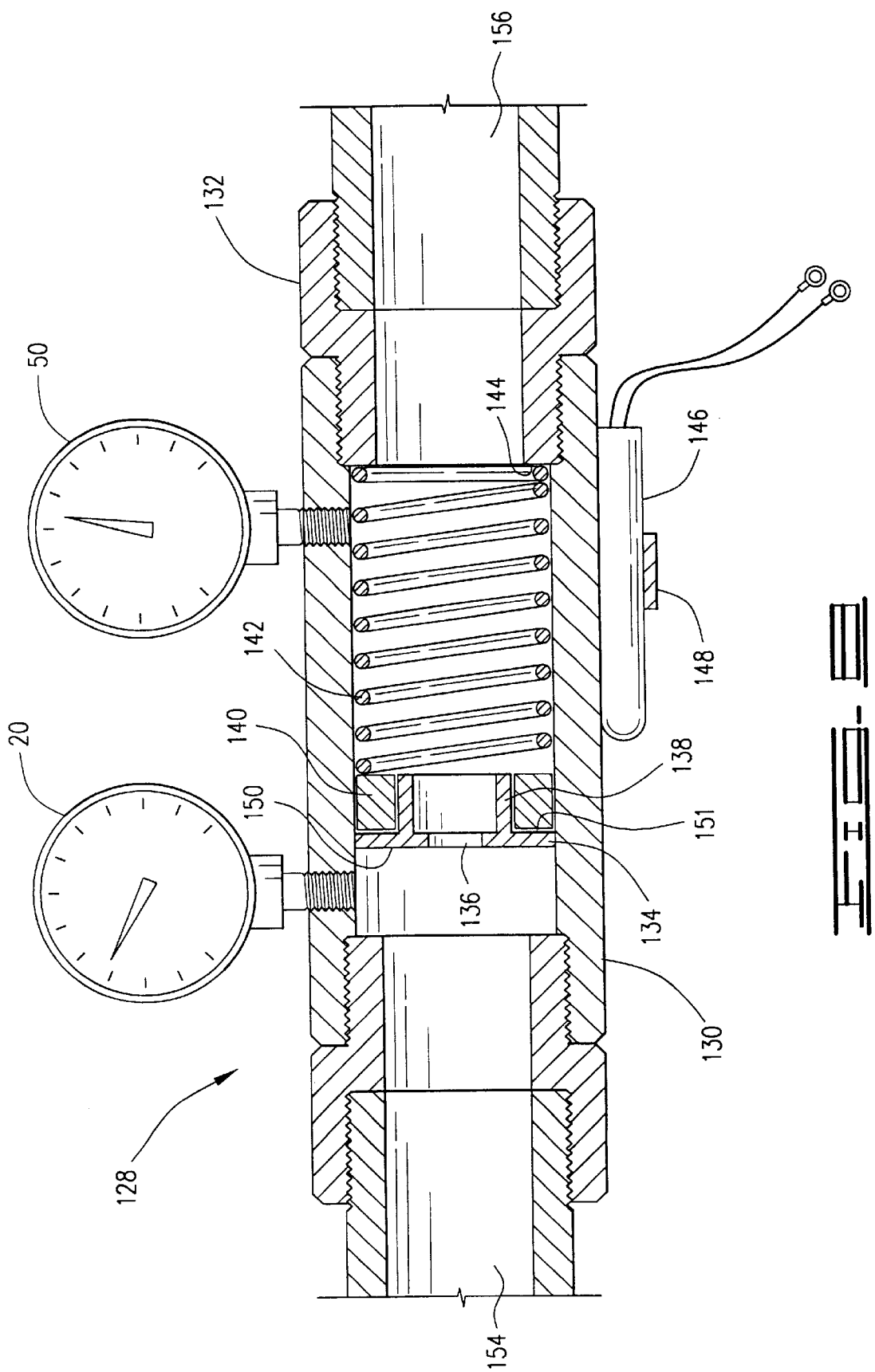

The differential pressure switch 34 shown in FIG. 7 may be used with the bypass system shown in FIG. 5 according to the overall plan shown in FIG. 4. The differential pressure switch 34 incorporates a first end 74 and a second end 76. The differential pressure switch 34 also has an inner surface 78 and an outer surface 80. A first cap 82 is disposed at the first end 74, and a second cap 84 is disposed at the second end 76. Both caps have an extended portion 86. Cap bolts 90 hold the caps against the respective ends. Each end had threaded thereinto a nipple 92 at or near its center. The nipple 92 has a rib 96 on a smooth hose end 94 and a threaded end 98. A nipple passageway 100 is defined therethrough for allowing fluid communication. A first inlet hose 104 is attached to the smooth hose end 94 by a clamp 102. Similarly, a second inlet hose 106 is attached to the corresponding smooth hose end 94b on the second end. A first membrane 108 is disposed between the first cap 82 and the first end 74. A reservoir 88 is defined by the first membrane 108 and the first cap 82. Further, another reservoir is defined by a second membrane 110 disposed between the second end 76 and the second cap 84. The membranes are fixed in place at their periphery 112 by a clamping action between the ends and the caps as biased by the bolts 90. A connector 114 attaches a support means 116 to the membranes. A magnet casing 120 is supported by the support means. Incorporated inside the magnet casing 120 is a magnet 118. A detector means 122 is attached to the inner surface 78. A first connection 124, and a second connection 126 are attached to the detector means 122 for carrying the signal created thereby away from the differential pressure switch 34.

As the flow through the system increases, the pressure on the upstream side at a differential pressure switch 34 becomes greater relative to the pressure on the downstream side of the switch 34. Thus, the first membrane 108 is displaced away from the first end, and the second membrane 110 is displaced toward the second end 76. This causes the magnet 118, attached to the support means 116 to be displaced towards the second end, and away from the first end. A magnetic field from the magnet 118 changes the electronic properties of the Reed switch, which is effectively the detector means 122, as it is displaced towards the second end 76. Thus, signals are created in the Reed switch 122 indicating that the differential pressure has increased. If the differential pressure continues to increase, at a preset point, an alarm signal is created.

Instead of the differential pressure switch described above, it is preferable to use a simple residential flow switch 128 shown in FIGS. 8 through 12 and 14 through 17. The combination orifice flow meter/displacement magnetic flow sensor 128 incorporates an annular housing 130. The annular housing 130 will preferably be composed of a non-magnetic, metallic material, such as aluminum. Alternatively, the annular housing may be comprised of a polymer such as CPVC or similar materials. The material of construction is not critical so long as it does not interfere with the operation of the Reed switch. The annular housing 130 has two ends, and at each end a bushing or reducer 132 adapted to be threadedly (or by a socket) attached thereto to allow connection of an inlet pipe at an inlet end 154 of the annular housing 130 and an outlet pipe at an outlet end 156 of the annular housing. A moving orifice plate 134, having a front face 150 and a back face 151, is adapted to be received within the annular housing 130. The annular housing has at least one section with a continuous diameter defined therein for receiving the moving orifice plate 134. The moving orifice plate has a diameter which is slightly smaller than that of the continuous diameter section of the annular housing 130, allowing a sliding motion therein, but preventing excess fluid to flow around a periphery of the moving orifice plate. A moving plate opening 136 is defined at or near the center of the moving orifice plate 134. An orifice plate magnet flange 138 having a diameter larger than that of the moving plate opening 136 is disposed on a back face 151. Disposed substantially around and outside the flange 138 is a circular orifice plate magnet 140. The moving orifice plate 134 is biased away from the outlet end 156 by a orifice plate spring 142. The orifice plate spring 142 is contained between an interior flange shoulder 144 near the outlet end 156, and the orifice plate magnet 140. Mounted on an exterior portion of the annular housing 130 is a Reed switch 146. The Reed switch 146 is attached to the annular housing 130 by an adjustable attachment means 148. Adjustment screws 152 hold the adjustable attachment means in place and allow it to be loosened for movement of the Reed switch. The adjustable attachment means 148 is shown in detail in FIG. 11 and FIG. 12.

Figure 17:
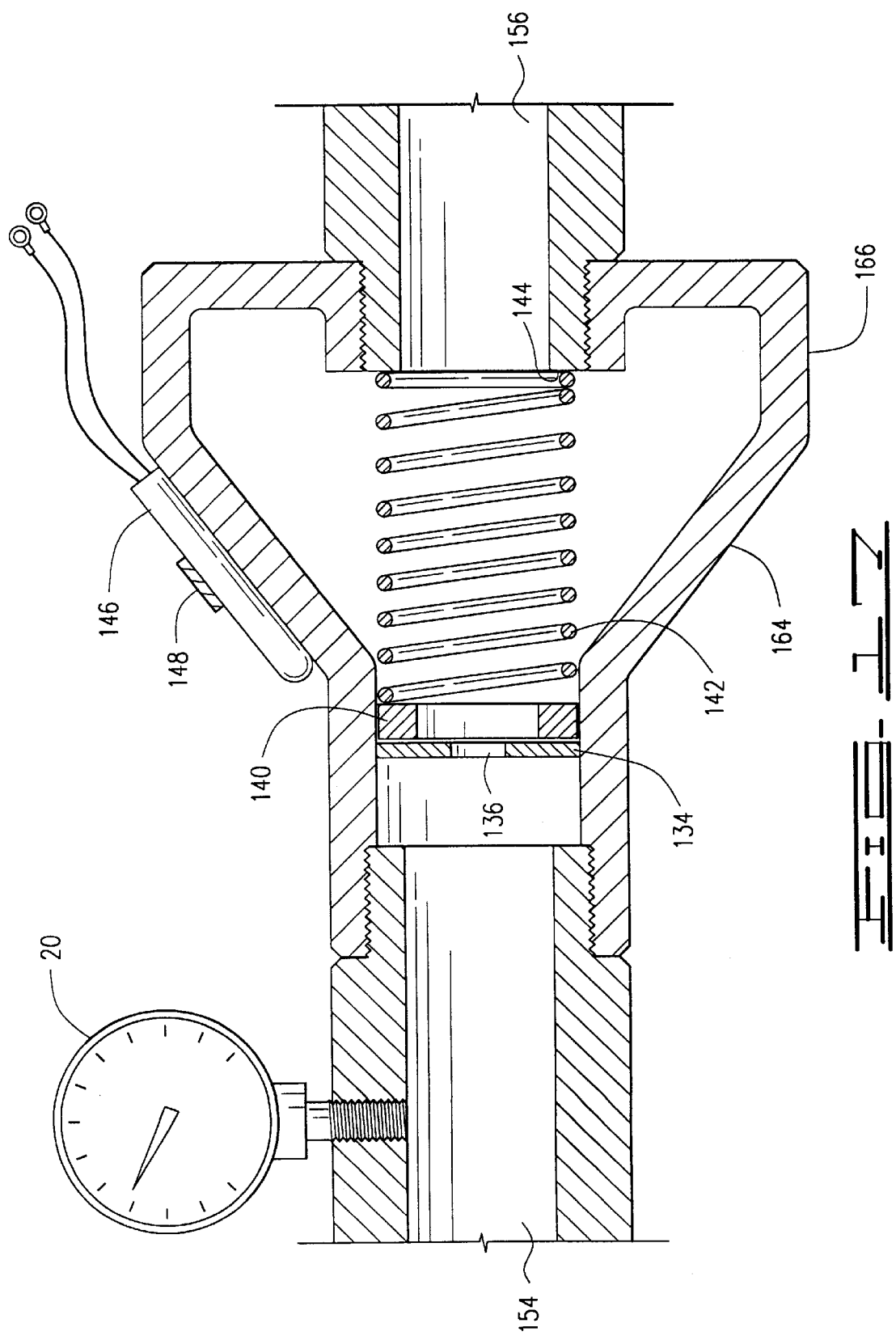
FIG. 17 is a cross-sectional view of a flow detection means incorporating an increased cross-sectional area to allow additional flow around the periphery of the orifice plate.

As shown in FIG. 17, the combination orifice flow meter/displacement magnetic flow sensor 128 may have an enlarged section 166 with a cross-section greater than the section with a continuous diameter as noted previously. The purpose of having the enlarged section 166 is to allow additional flow around the edges of the orifice plate as it is displaced backwardly into the enlarged section 166. Thus, if the flow becomes great enough, the flow may not only proceed through the orifice plate opening 136, but also around the edges of the orifice plate 134. A tapered section 164 makes the transition between the area with continuous cross-section and the enlarged section 166.

Figure 18:
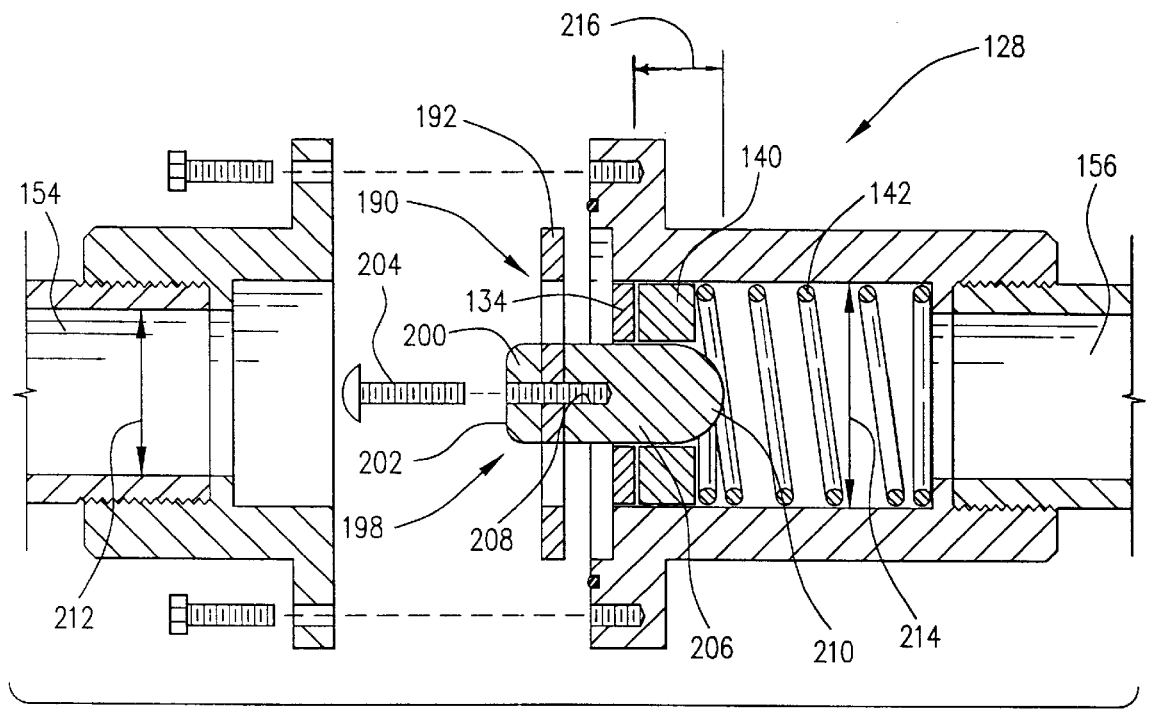
FIG. 18 is a cross-sectional view of a flow detection means incorporating a bullet rod.
Figure 19:
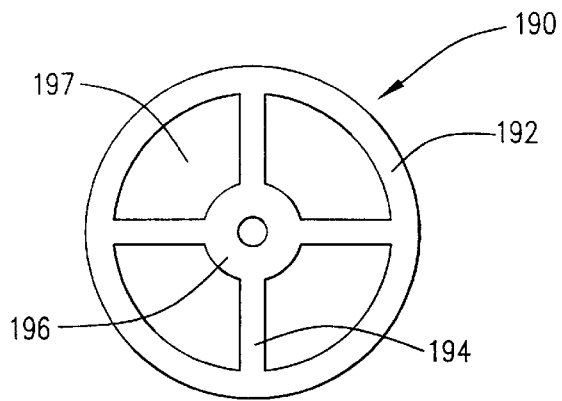
FIG. 19 is a front view of a bullet port.

Another related embodiment of the combination orifice flow meter/displacement magnetic flow sensor 128 is shown in FIG. 18. This embodiment is adapted to be used in systems where a water softener or similar pressure reducing device is present. The outlet to the water softener (not shown) will be on the supply side of the sensor 128, and the inlet from the water softener will be on the system side of the sensor (again, not shown). A bullet rod 198 is held in place by a bullet port 190 within the annular housing 130. The bullet port 190 is comprised of an outer annular ring 192 held in place between an annular shoulder and a bushing 132, support legs 194 projecting inwardly from the annular ring 192, and an inner support ring 196. An open port area 197 is defined between each of the support legs. Preferably, the sum of the open port areas is at least as large of the cross sectional area of the inlet pipe connected to the sensor 128, thus, the pressure drop through the device will be minimized. A bullet rod 198 having a head portion 200 with a leading end 202 and a threaded male end 204 adapted to be received through the inner support ring is provided. A tail portion 206 has a threaded female end 208 adapted to threadedly engage the male end 204, so that the tail portion 206 is held in place against the inner support ring 196. The tail portion 206 also has a tapered end 210. The tapered end faces the outlet end 156 of the sensor 128. The moving orifice plate opening 136 is sized to receive the tail portion 206 so as to allow sliding motion of the moving orifice place 134 and also to minimize flow between the tail and the orifice plate. Thus, as the moving orifice plate is displaced toward the outlet end by differential pressure, substantially all of the flow is diverted through the water softener until the differential pressure displaces the orifice plate past the tapered end 210, at which point water can flow through the orifice plate. As discussed below, preferably two Reed switches will be provided, the first for a trouble alarm 162, and the second for enunciating the alarm means 26.

Figure 14:
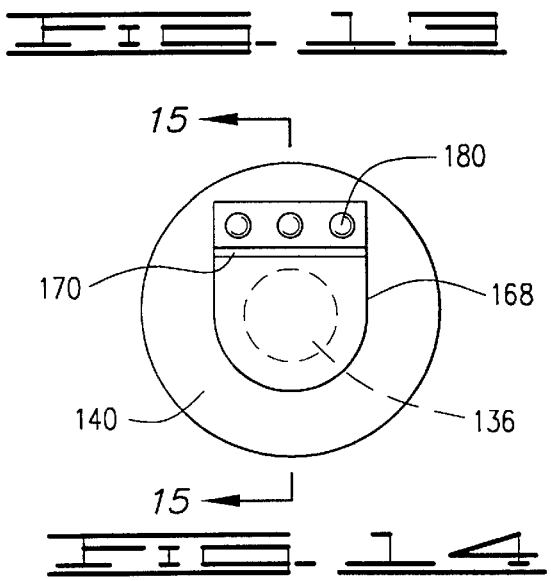
FIG. 14 is a front view of an orifice plate incorporating the anti-back flow flap.
Figures 15, 16:
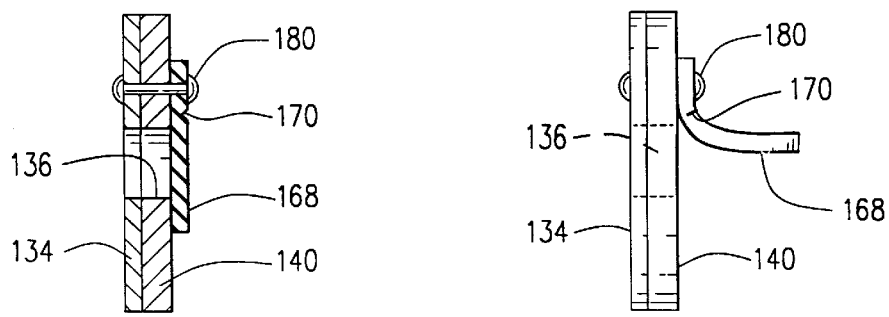
FIG. 15 is a cross-sectional view of the orifice plate incorporating the anti-back flow flap.
FIG. 16 is a side view of the orifice plate incorporating the anti-back flow flap in a flow condition where the flap is deflected away from the orifice plate.

An anti-back flow flap 168 is shown in FIGS. 14 through 16. The anti-back flow flap is preferably composed of a flexible synthetic polymeric material. The material selected for the anti-back flow flap should be compatible with the fluid flowing through the system, here namely water, so a wide variety of materials may be appropriate. It should have sufficient rigidity so that the flap will not be compressed backwardly through the orifice plate opening 136 if a back flow condition occurs, but sufficiently flexible so that it can deflect away from the orifice plate opening 136 upon a typical flow condition through the orifice plate opening. A flexibility groove 170 is preferably defined in the anti-back flow flap 168 along the length thereof, which allows the flap to more easily deform away from the orifice plate under flow conditions. The anti-back flow flap 168 is attached to the orifice plate 134 by attachment rivets 180. The anti-back flow flap is shown in a flow condition deformed away from the orifice plate 134 in FIG. 16.

Where a pressure drop is anticipated in a multipurpose system, such as a water softener, the bypass means shown in FIG. 5 and FIG. 6 can be utilized to ensure that adequate flow is provided for fire protection needs. The device causing the pressure drop will be generically referred to as a "flow impediment." Generally, the bypass means includes a first tee 54 with a water softener outlet 58, and may also incorporate an upstream sample port 44. Water passing through the water softener outlet goes through the water softener, not shown, and returns to the water softener return 60 in a second tee 56. Under extraordinary circumstances, where the water demand is greater than can be supplied through the water softener, an alternative flow path is provided. The alternative flow path is comprised of a check valve 62. The check valve 62 has an annular shoulder 64. An annular plate 66 is adapted to be biased against the annular shoulder 64 by a tension spring 68. Alternatively, the surface area of the annular plate could be larger on the system (lower pressure) side than on the supply (higher pressure) side so that it is naturally held in place by the differential pressure. The tension spring 68 is adapted to maintain a sealing contact between the annular shoulder 64 and the annular plat 66 until the pressure downstream of the water softener drops below a specified point. When the pressure drops too low, the annular plate 66 is biased away from the annular shoulder 64 by the differential pressure. A flow path is created there around allowing additional flow through the check valve 62. Thus, the bypass system provides an alternate, lower pressure drop flow path to ensure that a sufficient flow is provided for fire protection needs, where a flow impediment in the main flow path would otherwise prevent adequate flow for fire prevention needs.

Alternatively, the bypass system may incorporate an apparatus similar to the anti-back flow flap 168, described above. The orifice and flap would have a system side surface area of approximately 1.75 square inches, and the supply side would have a surface area of approximately 0.8 square inches for an approximate 2.25 to 1 ratio. That is, if the pressure on a supply side is 80 pounds per square inch, for example, the orifice plate will remain seated until the pressure on the system side drops to 35½ pounds per square inch. When the pressure drops to this level caused by friction loss, a water softener, or other flow restriction, the orifice flap will open allowing water to bypass the softener or other pressure drop. The pressure differential required to open the orifice flap could be adjusted by varying the surface areas to the desired ratio. Because the differential pressure seats the orifice flap, water is diverted through the water softener until the pressure loss on the system side causes the flow flap to open. This same concept is discussed above, but it is discussed in terms of a rigid plate.

It is also anticipated that the bypass system and flow measurement means can be incorporated in a single device. An orifice flow meter/displacement magnetic flow sensor 128 is provided. On the system side, a water softener outlet 58 is provided. A moving orifice plate 134 incorporating an anti-backflow flap 140 on the back side 151 thereof is disposed therein. Both the orifice plate 134 and the anti-backflow flap 140 have larger surface areas on the system side than the supply side. Preferably, the ratio of supply side to surface side is the same for both the plate 134 and the flap 140. Once the ratio of supply to system side pressures exceeds the surface area ratios, the anti-backflow flap 140 will open up and allow flow through the opening 136 and the moving orifice plate 134 will begin to be deflected toward the system side by the differential pressure.

As shown, the bypass system may incorporate a flanged fitting 70 incorporating flange o-rings 71 and flange bolts 72 to house an orifice plate 42. The orifice plate 43 itself may include a downstream sample port 46. In addition, the flanged fitting 70 may incorporate a pressure gauge port 73. After passing through the flanged fitting 70, the water supply goes to either domestic needs or fire protection needs. FIG.

6 provides a detailed cross-sectional drawing of the orifice plate 43 housed in the flanged fitting 70.

Preferably, the system includes a pressure gauge 20. Applicable standards specify a minimum volumetric flow rate at a specified residual pressure. In combination, the flow detection means (K) and the pressure gauge 20 ($P_T$) enable determination of whether the water flow rate through the system is sufficient to supply fire protection flow rates.

$$Q=K\sqrt{(P_T)}$$

To reiterate, the problem to be solved by the present invention is provision of a water-flow-based means of alarming an MPS. In the past, such systems had to utilize two completely different piping systems: one for domestic uses and one for fire sprinkler system uses. Previous alarms used in these systems were designed to create an alarm condition upon the detection of a flow (commonly 10 gpm). Typical domestic flows would have caused an alarm in a prior art system. Alternatively, prior art systems used a fire detection and alarm system which did not have a flow detector. These systems without a flow detector risked substantial water damage to the structure if a sprinkler head activated while no one was in the home.

The present system is based on the principle that domestic flow rates are much lower than flow rates needed for fire protection. Using a flow detection means 24 (FIG. 3), it is possible to create an alarm condition only upon detection of flows which are such as created by fire protection needs. Thus, an alarm condition is not created when typical domestic uses only are detected.

Figure 13:
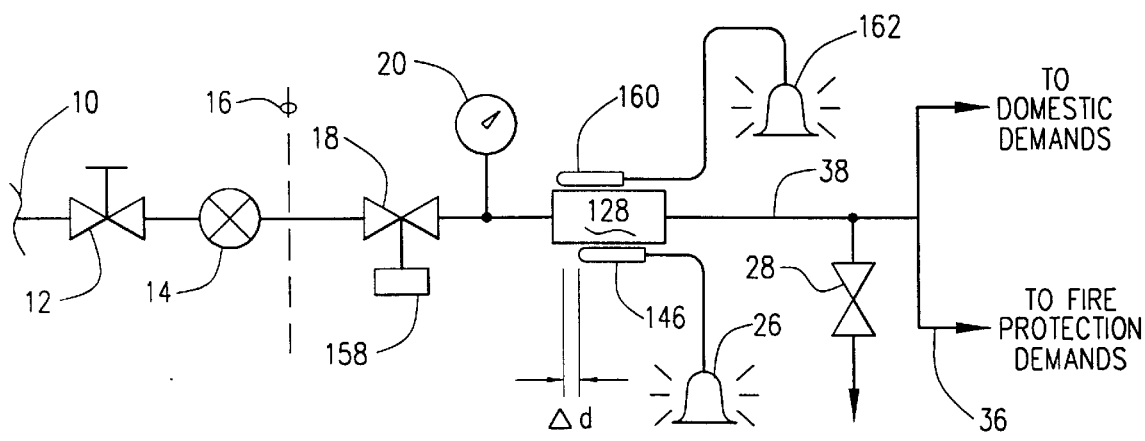
FIG. 13 is an illustration of an integrated system incorporating the preferred elements of the present invention for use in a multi-purpose piping system.

FIG. 13 shows the system incorporating the features disclosed herein. The system shown in FIG. 13 is an MPS system, but it could be that instead of incorporating domestic demands, the system could simply supply fire protection needs, in which case it would be more like a standard sprinkler system. A water supply means 10 supplies water through a gate valve 12 and a water meter 14 to the exterior wall 16 of the structure. The water enters the system through a main control valve 18. Preferably, as shown, the main control valve 18 will have a tamper protection means 158 for determining whether the valve is closed, and if so, enunciating a trouble alarm. A pressure gauge 20 is also preferably provided in the system. Water then flows through a combination orifice flow meter/displacement magnetic flow sensor 128. The sensor 128 shown has two normally open Reed switches disposed thereon for detecting flow as indicating by displacement of the moving orifice plate 134, not shown. The first Reed switch 146 is the same as previously disclosed, and enunciates a fire alarm via the fire alarm means 26. Preferably, the Reed switch 146 also activates a system which contacts emergency response personnel, such as fire departments. In addition to the fire alarm Reed switch 146, the present invention incorporates a first stage Reed switch 160. The first stage Reed switch 160 enunciates a first stage trouble alarm 162. Preferably, the first stage trouble alarm 162 is only enunciated within the structure (i.e., emergency response personnel are not contacted) The alarm is created when the domestic usage is excessive. Where the system is used with an MPS, the first state alarm will cause anyone in the residence to instinctively shut off water, for example a shower they may be taking. As another example, if a resident hears a first stage alarm, and they were washing dishes, they will most likely shut off the sink faucet. This natural reaction to the first stage alarm may reduce the water flow demand below the level where the first stage alarm enunciates, eliminating the alarm condition. As can be seen in FIG. 13, the first stage Reed switch 160 is displaced a slight distance, shown as delta "d," toward the inlet 154 of the flow sensor 128. Thus, as the moving orifice plate is displaces towards the outlet end 156 of the flow sensor 128, it will first activate the first stage Reed switch 160, enunciating the internal first stage trouble alarm 162. As the orifice plate 134 continues to be displaced towards the outlet end 156, it will next activate the fire alarm Reed switch 146, which enunciates the alarm means 26, preferably notifying emergency response personnel. The delta "d" (i.e., the linear displacement of the fire alarm Reed switch 146 and the first stage Reed switch 160) will be set in the field so that there is sufficient differential in the flow which activates the first stage alarm and the fire alarm to give residents or occupants of the structures sufficient time to shut off domestic demands before a fire alarm is created. This two-stage system also serves as a safety back up, because if one of the alarm stages fail, the other will still alert residents to the potential alarm condition.

Tamper detection means 158 on the main control valve 18 preferably incorporates Reed switches as well. As the handle is turned, a magnet on the handle activates a normally open Reed switch to close, enunciating an alarm notifying the occupants of the structure that the valve has been closed, and the fire protection system is not being supplied with water. Again, this is an important safety consideration in residential systems where small children, unknowing homeowners, and the like can easily turn off the system without realizing they are shutting off their fire protection system as well.

Though the invention has typically been described with reference to a multi-purpose piping system, it should be understood that the system could be used with any flow-based alarm system for fire protection. Further, the flow detection means disclosed herein could be used with any flow system, not just fire protection systems. That is, the flow detection means are capable of detecting the flow of any fluid through a piping system. The piping system could carry hydrocarbons, solvents, or any other liquid or potentially gaseous materials for that matter.

Operation

In operation the apparatus functions as both a domestic water supply system and a fire detection and alarm system. Under normal conditions, the water flow rate through the flow detection means 24 does not reach the fire suppression flow rates. When one or more sprinkler heads 30 activate, the flow detection means 24 detects the increased flow and sends an alarm to the alarm means 26. The alarm means 26 enunciates a visible or audible alarm indicating the alarm condition. It is well known in the prior art to activate a telephone modem-based system for calling, for example, the fire department, upon detection of an alarm condition. See, e.g., Otten, U.S. Pat. No. 5,139,044.It will be preferable to incorporate such a modem-based component in the present invention to notify the fire department and other emergency contacts should an alarm condition be detected. If one or more domestic cutoff valves 48 are included in the apparatus, the flow detection means 24 also sends a signal to activate the domestic cutoff valves, shutting off water to one or more domestic uses 23.

The method for calibrating the apparatus includes the following steps: (1) opening the drain/test connection to simulate a minimum fire protection flow rate caused by the operation of one sprinkler head; (2) setting the flow detection means 24 to create an alarm output when a flow rate just below the minimum fire protection flow rate is detected by the detecting means; (3) insuring that an alarm condition is created when a minimum fire protection flow rate is detected by opening the drain/test connection 28 and checking for an alarm condition; and (4) insuring that an alarm condition is not created with maximum domestic flow by simulating the maximum expected domestic flow, then checking for an alarm condition. As noted, the drain/test connection 28 can be adapted to receive different orifice plates to simulate different flow regimes. Preferably, there would be one orifice plate to simulate minimum fire protection flow and a second orifice plate to simulate maximum expected domestic flow. Where the drain/test connection 28 accepts interchangeable orifice plates, the calibration of the flow detection means 24 is greatly simplified. An operator simply inserts an orifice plate for simulating fire protection flow, then calibrates the flow detection means 24 to enunciate an alarm at a slightly lower flow rate. The operator then ensures that an alarm condition is created at the fire protection flow rate. Next, the operator replaces the orifice plate designed to simulate minimum fire protection flows with one designed to simulate maximum domestic flow. Finally, the drain/test connection 28 is again opened to ensure that an alarm condition is not created at maximum domestic flow rates.

When the system of FIG. 13 is provided, it is necessary to calibrate both the first stage trouble alarm 162 and the first stage Reed switch 160 by means similar to that noted above for the single stage fire alarm 26 and Reed switch 146. The preferred method is to first calibrate the fire alarm Reed switch 146. The calibration is very simple. First, the drain test connection is opened to simulate fire protection needs, the connection means for the Reed switch 146 are loosened, and it is moved towards the inlet end 154 of the sensor 128 until an alarm condition is created. The first stage Reed switch 160 will then be moved a slight distance further towards the inlet end 154. A typical domestic demand is then created by using the drain test connection 28 or flowing water from some number of plumbing fixtures. As the flow through the drain test connection approaches the highest end of the expected domestic demand, the first stage Reed switch 160 should be activated, activating a first stage trouble alarm 162. If the alarm is not activated, the first stage Reed switch 160 is moved further towards the inlet end 154 of the sensor 128.

To calibrate the differential switch 34 shown in FIG. 7, the first and second inlet hoses 104 and 106 respectively, are attached to sample ports upstream and downstream respectively of an orifice plate. A flow is then created which equals the largest expected domestic flow through the MPS. Either the position of the magnet 118 or the Reed switch 122 is adjusted until no alarm condition is caused by the maximum domestic flow. The minimum fire protection flow is then simulated. Again, the magnet 118 or the Reed switch 122 are moved until an alarm sounds. Maximum domestic flow is repeated to ensure that no alarm is enunciated upon maximum domestic flow, and once this is accomplished, the device is calibrated. In addition, it may be desirable to calibrate the differential pressure switch to create an output signal proportional to the flow rate. This would allow connection of the output signal to an electronic gauge to provide a read out of the actual flow rate through the MPS. In such case, flow rate readings are taken from at least two points. The flow rate readings are entered into an electronic system for creating a flow read out proportional to the signal created by the differential pressure switch. Systems of this type are disclosed, for example, U.S. Pat. No. 5,228,469 to Otten et al.

The detection means shown in FIGS. 8 through 12 is calibrated similar to the above-noted process for the differential pressure switch. However, the combination orifice flow meter/displacement magnetic flow sensor 128 incorporates both the flow measurement means as well as the orifice plate in one device. An orifice plate 134 is selected with an opening 136 appropriate for the flow rates expected. The orifice plate 134 is inserted into the annular housing 130 as shown in FIG. 8. That is, the back face 151 faces the outlet end 156. The orifice plate spring 142 is trapped between the moving orifice plate 134 and the orifice plate magnet 140. As with the differential pressure switch, the maximum domestic flow and the minimum expected fire protection flow are then simulated, and the Reed switch is adjusted to provide the appropriate outputs at the above-noted flow rates. As shown, the annular housing 130 may have sample ports for a pressure gauge 20 and a flow gauge 50. The flow gauge 50 provides a direct read out of the flow rate through the orifice plate.

While the invention has been shown, illustrated, described and disclosed in terms of embodiments or modifications which it is assumed, the scope of the invention should not be deemed to be limited by the precise embodiment or modification therein shown, illustrated, described or disclosed. Such other embodiments or modifications are intended to be reserved especially as they fall within the scope of the claims herein appended.

What I claim is:

1. A detecting means for use in a fire suppression and water flow alarm system, the detecting means of the type having (i) an annular housing to be installed in the flow path of the system, the annular housing having a fixed interior diameter in at least one section, (ii) a moving orifice plate defining an opening therein where the orifice plate has a diameter which is smaller than the diameter of the fixed section of the annular housing, but is sized so as to allow minimal flow of water around its edges and between the diameter of the annular housing, (iii) a magnet adapted to abut the back face of the orifice plate facing an outlet from the annular housing, (iv) a biasing means for urging the moving orifice plate away from an outlet end of the annular housing, and (iv) at least one Reed switch disposed on an outer surface of the annular housing for creating an electronic signal related to the position of the magnet within the annular housing, the Reed switch being attached so as to be easily movable in relation to and annular housing, whereby as fluid flows through the annular housing the orifice plate is urged towards to outlet end of the annular housing causing a change in the electronic signal created by the Reed switch, the improvement comprising: a bullet rod axially disposed within the annular housing so as to be received within the orifice plate opening, blocking flow through the opening until a specified differential pressure is reached when the orifice plate is displaced past the bullet rod allowing flow through the opening.

2. The detecting means of claim 1 where the fixed interior diameter equates to a cross sectional area which is substantially equal to a cross section of an inlet pipe supplying flow to the detecting means.

3. The detecting means of claim 2 where a first Reed switch is provided to sound a trouble alarm when a specified differential pressure is reached and a second Reed switch is provided to enunciate a fire alarm when a greater specified differential pressure is reached.

* * * * *